(12) United States Patent
Caddell et al.

(10) Patent No.: US 10,065,080 B2
(45) Date of Patent: Sep. 4, 2018

(54) BIODEGRADABLE MATERIALS AND METHODS OF MAKING THE SAME

(71) Applicant: University of Maine System Board of Trustees, Bangor, ME (US)

(72) Inventors: Alexander G. Caddell, Winterport, ME (US); Carin Poeschel Orr, Denver, CO (US); David J. Neivandt, Bangor, ME (US)

( * ) Notice: Subject to any disclaimer, the term of this patent is extended or adjusted under 35 U.S.C. 154(b) by 0 days.

(21) Appl. No.: 15/227,394

(22) Filed: Aug. 3, 2016

(65) Prior Publication Data

US 2017/0173403 A1   Jun. 22, 2017

Related U.S. Application Data

(63) Continuation of application No. 14/007,101, filed as application No. PCT/US2012/030400 on Mar. 23, 2012.

(60) Provisional application No. 61/467,367, filed on Mar. 24, 2011.

(51) Int. Cl.

| A63B 37/12 | (2006.01) |
| A63B 37/02 | (2006.01) |
| C08L 89/06 | (2006.01) |
| C08L 5/08 | (2006.01) |
| A63B 37/00 | (2006.01) |
| A63B 45/00 | (2006.01) |
| C08L 101/16 | (2006.01) |
| C08L 89/00 | (2006.01) |

(52) U.S. Cl.
CPC ...... *A63B 37/0077* (2013.01); *A63B 37/0024* (2013.01); *A63B 37/0051* (2013.01); *A63B 37/0074* (2013.01); *A63B 45/00* (2013.01); *C08L 89/00* (2013.01); *C08L 101/16* (2013.01); *C08L 2201/06* (2013.01)

(58) Field of Classification Search
None
See application file for complete search history.

(56) References Cited

U.S. PATENT DOCUMENTS

| 4,286,087 A | * | 8/1981 | Austin | C08B 37/003 |
| | | | | 514/55 |
| 4,920,158 A | | 4/1990 | Murray et al. | |
| 5,098,104 A | | 3/1992 | Kane | |
| 5,288,318 A | | 2/1994 | Mayer et al. | |
| 5,502,178 A | | 3/1996 | Gupta | |
| 5,716,440 A | * | 2/1998 | Andou | B09B 3/00 |
| | | | | 106/124.1 |
| 6,406,530 B1 | * | 6/2002 | Bengs | B65D 65/466 |
| | | | | 106/137.1 |
| 2003/0066231 A1 | * | 4/2003 | Ollis | A01K 85/00 |
| | | | | 43/42.24 |
| 2010/0248861 A1 | | 9/2010 | Mo | |
| 2014/0011610 A1 | | 1/2014 | Caddell et al. | |

FOREIGN PATENT DOCUMENTS

| WO | WO-2008/014573 | * | 2/2008 |
| WO | WO-2009/046657 A1 | | 4/2009 |

OTHER PUBLICATIONS

Rosa; Effect of Chitin Addition on Injection-Molded Thermoplastic Corn Starch; ; Journal of Applied Polymer Science vol. 92 (2004) pp. 2706-2713.*
Arvanitoyannis et al., Chitosan and gelatin based edible films: state diagrams, mechanical and permeation properties, Carbohydrate Polymers, 37:371-382 (1998).
International Preliminary Report on Patentability for PCT/US2012/030400, 5 pages (dated Oct. 3, 2013).
International Search Report for PCT/US2012/030400, 3 pages (dated Oct. 18, 2012).
Souza Rosa, R.C.R. and Andrade, C.T., Effect of Chitin Addition on Injection-Molded Thermoplastic Corn Starch, Journal of Applied Polymer Science, 92:2706-2713 (2004).
Written Opinion for PCT/US2012/030400, 4 pages (dated Oct. 18, 2012).
Yuan, T.T. et al., Preparation of Completely Degradable Plastic, Xiangsu Ziyangsu Liyong, with English translation of abstract, 7 pages (2009).

* cited by examiner

*Primary Examiner* — David J Buttner
(74) *Attorney, Agent, or Firm* — Choate, Hall & Stewart LLP; Brian E. Reese; Meaghan E. Bychowski

(57) ABSTRACT

Biodegradable materials and methods of their manufacture. Certain embodiments of the biodegradable materials include a crustacean shell material, at least one of gelatin, glycerin, and sorbitol, and water, wherein the biodegradable material is characterized in that, when it is exposed to water for an extended period of time, the material at least partially decomposes. Particular embodiments may comprise additional components including sorbitol and glycerin in the case of biodegradable golf ball embodiments, for example.

12 Claims, 1 Drawing Sheet

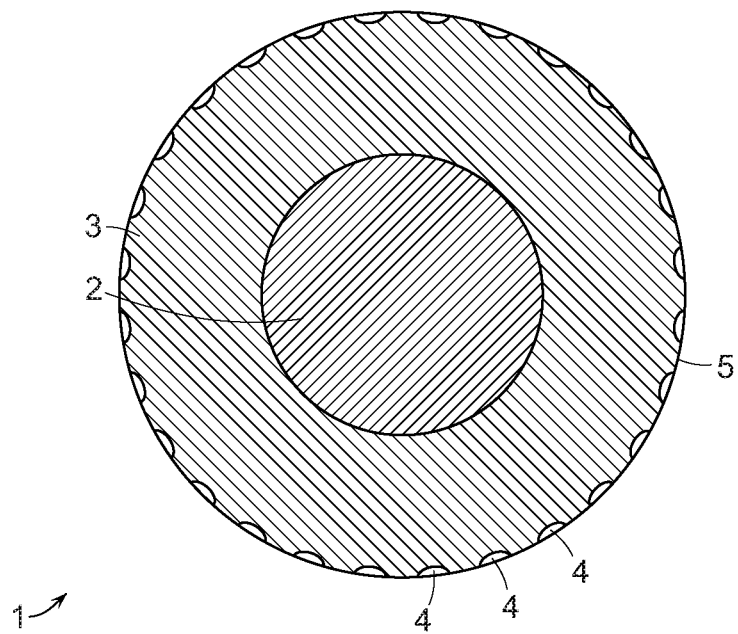

BIODEGRADABLE MATERIALS AND METHODS OF MAKING THE SAME

CROSS REFERENCE TO RELATED APPLICATIONS

This application is a continuation application of U.S. patent application Ser. No. 14/007,101, filed on Sep. 24, 2013, now abandoned which is a U.S. national phase entry of PCT Application No. PCT/US12/30400, filed Mar. 23, 2012, which claims priority to U.S. provisional application Ser. No. 61/467,367, filed on Mar. 24, 2011, each of which are hereby incorporated by reference, in their entirety.

BACKGROUND

Background Information

Biodegradable materials are becoming increasingly important as the effects of human industry are becoming better understood. A wide variety of industrial processes generate harmful waste products that damage or endanger the environment and an array of sensitive species.

It is important that humanity reduce its negative environmental impact. While recycling is a partial solution, another partial solution is the increased use of biodegradable products, including those products that are themselves made from waste products.

SUMMARY

The present invention provides methods and materials that have desirable properties for a variety of applications, are created at least in part from common waste products, and are biodegradable upon sustained exposure to water.

The present invention provides, in one aspect, a biodegradable material including a crustacean shell material, at least one of gelatin, glycerin, and sorbitol, and water, wherein the biodegradable material is characterized in that, when it is exposed to water for an extended period of time, the biodegradable material at least partially decomposes.

The present invention provides, in another aspect, methods of making a biodegradable material, such methods including steps of providing a crustacean shell material, at least one of gelatin, glycerin, and sorbitol, and water, mixing the crustacean shell material, gelatin, and water to form a mixture, heating said mixture to between about 65° C. to about 100° C., and cooling said mixture to form a biodegradable material, wherein the biodegradable material is characterized in that, when it is exposed to water for an extended period of time, the biodegradable material at least partially decomposes.

The present invention provides, in still another aspect, a biodegradable golf ball including a core comprising a crustacean shell material, calcium carbonate, gelatin, sorbitol, water and glycerin, and a shell comprising gelatin, water and at least one of glycerin and sorbitol, wherein the biodegradable golf ball is characterized in that, when it is exposed to water for an extended period of time, the biodegradable golf ball at least partially decomposes.

The present invention provides, in yet another aspect, methods of making a biodegradable golf ball, such methods including steps of providing crustacean shell material, providing calcium carbonate, gelatin, sorbitol, water and glycerin, combining crustacean shell material, calcium carbonate, gelatin, sorbitol, water and glycerin to form a core material, heating the core material to about 65° C. to about 100° C., shaping the core material, cooling the shaped core material, providing gelatin, water, and least one of glycerin and sorbitol, mixing said gelatin, water, and least one of glycerin and sorbitol to form a shell material, enveloping the cooled shaped core material in the shell material, hardening the shell material to form a biodegradable golf ball, wherein the biodegradable golf ball is characterized in that, when it is exposed to water for an extended period of time, the biodegradable golf ball at least partially decomposes.

These, and other objects, features and advantages of this invention will become apparent from the following detailed description of various aspects of the invention taken in conjunction with the accompanying drawing.

BRIEF DESCRIPTION OF THE DRAWING

One or more aspects of the present invention is particularly pointed out and distinctly claimed at the conclusion of the specification. The foregoing and other objects, features, and advantages of the invention are apparent from the following detailed description taken in conjunction with the accompanying drawing in which:

FIG. 1 illustrates a cross sectional view of one embodiment of one or more aspects of the present invention.

DETAILED DESCRIPTION OF THE INVENTION

The present invention provides biodegradable materials that may have varying properties according to a specific application for which one or more embodiments are being used. Aspects of the invention may have a high degree of mechanical hardness or toughness and be biodegradable upon sustained exposure to water.

In one aspect, the invention provides a biodegradable material including a crustacean shell material, at least one of gelatin, glycerin, and sorbitol, and water, wherein the biodegradable material is characterized in that, when it is exposed to water for an extended period of time (e.g., longer than about two hours), the biodegradable material at least partially decomposes.

The form of crustacean shell material may vary according to the application for which the present invention is being used. For example, crustacean shell material utilized in accordance with the present invention may be in the form of a powder, for example, a powder with particles substantially between about 0.001 mm and 10 mm in diameter, between about 0.001 mm and 5 mm, between about 0.001 mm and 2 mm, or between about 0.002 mm and 1 mm. Such a powder form of crustacean shell material may be prepared according to any appropriate procedure, including for example comminution.

In some embodiments, a crustacean shell may undergo one or more processing steps before it is combined with other ingredients, such as gelatin, glycerin, and/or sorbitol, in accordance with the present invention. Such processing steps may include one or more of, heating, cooling, grinding, pressing or any other desired processing to provide crustacean shell material with desired properties or characteristics Alternatively or additionally, crustacean shell material may be utilized in accordance with the present invention in particular amounts suitable to specific applications. As a non-limiting example, the crustacean shell material may make up between about one tenth or more by weight of the total biodegradable material produced for a particular application. Alternative or additional amounts, or amount ranges, may include between about one tenth and about three quarters by weight of the total biodegradable material, between about one tenth and about one half by weight of the total biodegradable material, between about one sixth and about one third by weight of the total biodegradable material.

Any of a variety of specific crustacean shell materials may be used according to various aspects of the invention. Exemplary crustacean shell materials include, but are not limited to, lobster shell material, crab shell material, shrimp shell material, crayfish shell material, krill shell material and combinations thereof.

A variety of gelatins may be utilized, depending upon the intended characteristics of the biodegradable material desired and the application for which an aspect of the present invention is intended. For some uses, such as golf balls, ballistics-grade gelatin may be used. As with the crustacean shell material above, the amount of gelatin by weight relative to the total of the biodegradable material produced may vary in an application-specific manner. For example, according to some embodiments, gelatin may make up between about one tenth or more by weight of the total biodegradable material produced for a particular application. Additional ranges may include between about one tenth and about three quarters by weight of the total biodegradable material, between about one tenth and about one half by weight of the total biodegradable material, between about one sixth and about one third by weight of the total biodegradable material. According to some embodiments, it may be desirable for the gelatin to be at or near standard room temperature prior to mixing with other ingredients.

Glycerin may be utilized in accordance with the present invention in a variety of forms and purities, for example forms that facilitate mixing of other components of specific embodiments of the biodegradable material. According to certain embodiments, glycerin may serve as a type of media or base to which the other ingredients are added or mixed into. Exemplary acceptable levels of purity include at least 75% pure, at least 80% pure, at least 85% pure, at least 90% pure, and at least 95% pure.

A sorbitol may be used in different amounts according to certain embodiments. Exemplary amounts include from about one-tenth of one percent to about twenty five percent of the biodegradable material by weight, from one-tenth of one percent to about twenty percent of the biodegradable material by weight, from about one-tenth of one percent to about fifteen percent of the biodegradable material by weight, from about one percent-tenth of one percent to about ten percent of the biodegradable material by weight, from about one-tenth of one percent to about five percent of the biodegradable material by weight, and from about one-tenth of one percent to about three percent of the biodegradable material by weight. Certain embodiments may not include any sorbitol.

Embodiments of the biodegradable materials of the invention may include various combinations of glycerin, gelatin, and sorbitol as desired, or required for a particular application of the invention. Non-limiting combinations include biodegradable materials including crustacean shell material, water, and: gelatin alone, glycerin alone, sorbitol alone, both gelatin and glycerin, both gelatin and sorbitol, both glycerin and sorbitol, and gelatin, glycerin and sorbitol.

The degree of purity of the sorbitol may vary according to certain embodiments as well. Exemplary acceptable levels of purity include at least 75% pure, at least 80% pure, at least 85% pure, at least 90% pure, and at least 95% pure.

According to certain embodiments, other binders, humectants, oleochemicals, plasticisers, or thickening agents may also be used in addition to or in place of glycerin, gelatin, and/or sorbitol according to some aspects of the invention. Non-limiting examples of such materials include animal fat derivatives, plant fat derivatives, fatty acids, distilled fatty acids, polyunsaturated fatty acids, and oleic acids. The specific agent used in some aspects of the invention may vary according to a desired application or desired properties of the biodegradable material.

In some aspects of the invention, additional materials may be used in addition to, or in place of the gelatin, glycerin and/or sorbitol. Non-limiting examples of such substitutes include calcium carbonate, titanium dioxide, cellulose and its derivatives, and clay.

Water used in accordance with the present invention may be of any application-appropriate sort including fresh water (including municipal water), salt water, deionized water, distilled water, or water purified by any means including reverse osmosis, carbon filtration, ultrafiltration, ultraviolet oxidation, electrodialysis.

One surprising advantage of aspects of the present invention is that exposure to water for an extended period of time may cause the biodegradable material to at least partially decompose. This decomposition may include loss of shape, resiliency and composition, and may also result in substantial decomposition to constituent components. As used herein, the phrase "extended period of time" is meant to include time periods of at least 2 hours. Exemplary time periods which would be considered extended periods of time include between about two hours and about one year, between about two hours and about six months, between about two hours and about three months, between about two hours and about one month, between about two hours and about two weeks, and between about one day and about one week.

In another aspect, the invention provides methods of making a biodegradable material, the method including the steps of providing a crustacean shell material, at least one of gelatin, glycerin, and sorbitol, and water, mixing the crustacean shell material, gelatin, and water to form a mixture, heating said mixture to between about 65° C. to about 100° C., and cooling said mixture to form a biodegradable material, wherein the biodegradable material is characterized in that, when it is exposed to water for an extended period of time, the biodegradable material at least partially decomposes.

Each of the ingredients utilized in accordance with the present invention, including the crustacean shell material, gelatin, and water may vary as described above. Mixing may take a variety of forms depending upon the specific embodiment of the material and desired characteristics thereof. Mixing may include placing all of the ingredients together in a vessel and then applying mechanical force to mix them, or it may include mixing two ingredients together and then adding one additional ingredient and mixing again until all desired ingredients have been added. Mixing may be done by one or more machines or by hand and may involve high speed mixing or slow speed mixing, such as with a spatula.

The temperature to which the mixture is heated may be altered to suit a particular embodiment of the material. Exemplary temperature ranges which are contemplated as within the scope of the invention include, but are not limited to, between about 65° C. to about 100° C., between about 70° C. to about 100° C., about 70° C. to about 95° C., between about 75° C. and about 95° C., between about 80° C. to about 90° C. Also the rate at which the mixture is heated may vary as required for a particular embodiment of the material.

The method of heating the mixture may also vary according to a particular embodiment. Exemplary heating mechanisms include use of convection or conduction, such with an oven or stove like device, a heated water bath, exposure to open flame, or any other known manner of heating a material.

Cooling the mixture may take several forms, depending upon the specific embodiment of the material being created and the desired characteristics thereof. Cooling may include simply removing the material from the heat source and allowing it to cool to standard room temperature, or it may include active cooling such as in a refrigerator or freezer type device, or by circulating coolant proximal the material, for example, circulating coolant through a mold containing the material. According to certain embodiments, cooling may include reducing the heated mixture to freezing temperatures, where other embodiments will not require cooling down to freezing temperatures.

In still another aspect, the invention provides a biodegradable golf ball including a core comprising a crustacean shell material, calcium carbonate, gelatin, sorbitol, water and glycerin, and a shell comprising gelatin, water and least one of glycerin and sorbitol, wherein the biodegradable golf ball is characterized in that, when it is exposed to water for an extended period of time, the biodegradable golf ball at least partially decomposes.

The crustacean shell material, gelatin, sorbitol, water and glycerin used to form the core may be substantially as described above, including variations and amounts described. Calcium carbonate used in the core material may be used in different amounts according to various embodiments of the material, with golf ball embodiments typically comprising between about one percent to about five percent calcium carbonate by weight of the core material, or about three percent to about five percent by weight of the core material. Calcium carbonate used in accordance with the present invention may vary in purity according to certain embodiments. Exemplary acceptable levels of purity include at least 75% pure, at least 80% pure, at least 85% pure, at least 90% pure, and at least 95% pure.

In addition, biodegradable golf balls of the present invention may comprise further additives such one or more colorants, for example, pigments or dyes. Exemplary pigment colorants include titanium-based pigments, for example, titanium dioxide; cadmium-based pigments; carbon-based pigments; chromium-based pigments; cobalt-based pigments; copper-based pigments; clay earth-based pigments; lead-based pigments; and zinc-based pigments. Exemplary dye colorants include organic des, synthetic dyes, alcian dyes, alizarin dyes, azophloxin dyes, Bismarck dyes, cresyl dyes, chrysoidine dyes, congo red, fuchsin acid, Gentian violet, janus green, lissamine fast yellow, martius yellow, meldola blue, metanil yellow, methyl dyes, naphthalene dyes, naphthol dyes, orange G, Rose Bengal, sudan II, titan yellow, tropaeolin dyes, Victoria blue dyes, and xylene dyes, among others.

Though many golf ball embodiments of the invention may have a shell, this is not required and it is specifically contemplated that some embodiments of golf balls according the present invention will not have a shell. It is also contemplated that additional components, such as a sealant, may also be used in accordance with the present invention.

In still another aspect, the invention provides methods of making a biodegradable golf ball including the steps of providing crustacean shell material, providing calcium carbonate, gelatin, sorbitol, water and glycerin, combining crustacean shell material, calcium carbonate, gelatin, sorbitol, water and glycerin to form a core material, heating the core material to about 65° C. to about 100° C., shaping said core material substantially into a sphere, cooling the shaped core material, providing gelatin, water, and at least one of glycerin and sorbitol, mixing the gelatin, water, and least one of glycerin and sorbitol to form a shell material, enveloping the cooled shaped core material in the shell material, hardening the shell material to form a biodegradable golf ball, wherein the biodegradable golf ball is characterized in that, when it is exposed to water for an extended period of time, the biodegradable golf ball at least partially decomposes.

The amounts and types of ingredients used in these methods may be substantially as described elsewhere in this disclosure. With regard to relative amounts of each component in the core, one exemplary ratio of crustacean shell material, calcium carbonate, gelatin, water, glycerin and sorbitol comprising said core material is about 19.5:2.6:19.5:16.9:0.1-2.6. The combining step may be similar to the mixing step described for other methods herein including use of high or low speed mixing and mixing all of the ingredients at once or mixing certain ingredients separately prior to combining with other ingredients.

Heating the shaped core material may be accomplished as described elsewhere in this disclosure, including the use of various convection or conduction modalities. Exemplary temperature ranges which are contemplated as within the scope of the invention include, but are not limited to, between about 65° C. to about 100° C., between about 70° C. to about 100° C., about 70° C. to about 95° C., between about 75° C. and about 95° C., between about 80° C. to about 90° C. Also the rate at which the mixture is heated may vary as required or desired for a particular embodiment of the material.

Shaping the core material may be accomplished in a variety of ways including pouring the mixed or combined material into a mold, pressing the combined material, extruding the material, or any other manner of shaping the material as known in the art. These methods of shaping may also be used in non-golf ball embodiments of the material.

Cooling the shaped core material may also vary as described elsewhere in this disclosure including by cooling to temperatures above or below freezing temperatures. Cooling may include simply removing the material from the heat source and allowing it to cool to standard room temperature, or it may include active cooling such as in a refrigerator or freezer type device or by circulating coolant proximal the material, for example, circulating coolant through a mold containing the material. According to certain embodiments, cooling may include reducing the heated mixture to freezing temperatures, where other embodiments will not require cooling down to freezing temperatures.

Formation of the shell material may be accomplished using variations of the processes described for other embodiments of the biodegradable material, if desired. These include the various mechanisms for mixing the ingredients as well as methods of heating and cooling, if such steps are desired for a particular embodiment.

Typical shell materials created for golf ball embodiments will comprise gelatin, water, and least one of glycerin and sorbitol. The types and forms of gelatin, water, glycerin and sorbitol may vary as described elsewhere, and the ratio of these materials may vary according to a desired embodiment. An exemplary ratio of these materials that is acceptable for the shell material of golf ball embodiments is a ratio of gelatin, water, glycerin and sorbitol of about 30:30:0.1-2.0:0.1-2.0.

For golf ball embodiments, the shell material, if present, may typically be of a liquid or semi-solid form prior to enveloping the cooled core material. An exemplary method of enveloping the core material in the shell material is in suspending the core material in a mold which is larger than the core material and shaped as desired, for example, as a sphere for golf ball embodiments, then introducing the shell material to the mold such that it completely envelops the core material to a desired thickness and degree. In addition, it may be desired that the mold is designed to impart surface features to the golf ball, typically in the form of dimples. For other embodiments of the biodegradable material, surface features may be imparted in any application appropriate manner including the use of various molds, addition through use of a machine, or addition through the use of hand tools. The surface features may be decorative or serve a functional purpose, as the dimples do in golf ball embodiments.

According to particular embodiments, hardening of the shell material may be accomplished through exposure to air, through cooling, or by treatment with one or more exogenous compounds or materials.

Biodegradable materials in accordance with the present invention may be shaped to perform in any desired application. For golf ball embodiments, a roughly spherical shape is typically desired. However, other shapes may be desired or necessitated by the intended application of the material. Exemplary shapes include cubes, parallelograms, cones, pyramids, rectangular prisms, triangular prisms, cylinders, squares, triangles, circles, rectangles, and any other known two or three dimensional shape that may be appropriate or desired for a particular use.

One surprising advantage of making biodegradable golf balls using biodegradable materials as herein described is that there may be a positive environmental impact. Specifically, when traditional golf balls become lost, either in vegetation or in a body of water, for example, they may reside in the environment for extremely long periods of time and may leach harmful chemicals into the surrounding environment. Golf balls made as described herein, however, have the advantage of decomposing over time, thereby reducing the environmental impact of losing golf balls during play. Additionally, International Maritime Law presently prohibits the practice of hitting golf balls off of cruise ships because traditional golf balls qualify as an environmental pollutant since they are constructed of materials that do not break down for extremely long periods of time, if ever. The practice of hitting golf balls off of cruise ships was very popular, with tens of thousands of balls being hit during the course of some voyages. Use of the materials and processes described herein may allow travelers to again enjoy this past time.

The biodegradable materials described may be used in a variety of ways. Non-limiting exemplary uses for materials in accordance with the present invention include: plant pots such as starter pots for seedling plants; golf tees; garden stakes; disposable dinnerware items such as forks, knives, spoons, plates, bowls and cups; fertilizer stakes; chewable pet treats; skeet shooting targets; surveying or marking stakes; soil and water fertilizing tablets; as well as many other items for commercial, medical, scientific or other use.

In addition, biodegradable materials in accordance with the present invention may contain additional components, such as colorants (including pigments and/or dyes), humectants, stiffening agents, or texturing agents as desired for a particular embodiment. Exemplary pigment colorants include titanium-based pigments, for example, titanium dioxide; cadmium-based pigments; carbon-based pigments; chromium-based pigments; cobalt-based pigments; copper-based pigments; clay earth-based pigments; lead-based pigments; and zinc-based pigments. Exemplary dye colorants include organic des, synthetic dyes, alcian dyes, alizarin dyes, azophloxin dyes, Bismarck dyes, cresyl dyes, chrysoidine dyes, congo red, fuchsin acid, Gentian violet, janus green, lissamine fast yellow, martius yellow, meldola blue, metanil yellow, methyl dyes, naphthalene dyes, naphthol dyes, orange G, Rose Bengal, sudan II, titan yellow, tropaeolin dyes, Victoria blue dyes, and xylene dyes, among others.

While a variety of biodegradable materials and methods of making them are described above, the following examples are intended to further illustrate various aspects and/or embodiments of the present invention.

EXAMPLE

One example of an application of aspects of the present invention is found in making biodegradable golf balls. Biodegradable golf balls made as herein described may be environmentally safe and perform substantially the same as a standard golf ball when hit by a golf club. For the purposes of this example, the golf balls were formed using a two-phase molding operation that utilizes a core comprised of several naturally occurring compounds, including ground lobster shells, calcium carbonate, gelatin, glycerin, sorbitol and water, as well as a shell comprised of gelatin, glycerin, sorbitol and water.

Referring now to FIG. 1, the biodegradable golf ball 1 is comprised of a core material 2 that is encased in a shell material 3. Recessed dimples 4 are substantially uniformly distributed in plurality across the outer surface 5 of shell material 3.

As best seen in FIG. 1, in this example, core material 2 comprises a significant portion of the invention by volume, and also the largest portion by weight. Core material 2 was formed by combining and mixing, in this example, six ingredients: ground lobster shells, calcium carbonate, gelatin, glycerin, sorbitol and water. By weight, these ingredients were combined at several relative ratios of lobster shell material, calcium carbonate, gelatin, water, glycerin and sorbitol. The ratios employed in this example are shown in Table 1 below. The data in the table shows the amount of each ingredient in a specific core material embodiment, in grams immediately after molding and cooling.

TABLE 1

|  | Gelatin | Lobster Shell Material | $CaCO_3$ | Water | Glycerin | Sorbitol |
|---|---|---|---|---|---|---|
| Core1 | 19.5 | 19.5 | 2.6 | 16.9 | 2.6 | 0 |
| Core2 | 19.5 | 19.5 | 2.6 | 16.9 | 1.3 | 1.3 |
| Core3 | 19.5 | 19.5 | 2.6 | 16.9 | 0 | 2.6 |
| Core4 | 13.4 | 13.4 | 1.78 | 11.6 | 1.78 | 0 |
| Core5 | 13.4 | 13.4 | 1.78 | 11.6 | 0.89 | 0.89 |
| Core6 | 13.4 | 13.4 | 1.78 | 11.6 | 0 | 1.78 |

Shell material 3 was comprised of gelatin, glycerin, sorbitol and water. Additional materials may be present in other embodiments including additional or alternative colorants or fillers to reduce the needed amount of gelatin required and or impart desired properties. By weight, these ingredients were combined at several relative ratios of gelatin, glycerin, sorbitol, water and titanium dioxide (as a colorant). The ratios employed in this example are shown in Table 2 below. The data in the table shows the amount of each ingredient in a specific shell material embodiment, in grams.

TABLE 2

|  | Gelatin | TiO2 (colorant) | Water | Glycerin | Sorbitol |
|---|---|---|---|---|---|
| Shell1 | 30 | 2 | 30 | 2 | 0 |
| Shell2 | 30 | 2 | 30 | 0.5 | 1.5 |
| Shell3 | 30 | 2 | 30 | 2 | 0 |
| Shell4 | 6.33 | 0.42 | 6.33 | 0.42 | 0 |
| Shell5 | 6.33 | 0.42 | 6.33 | 0.105 | 0.315 |
| Shell6 | 6.33 | 0.42 | 6.33 | 0 | 0.42 |

Of the major ingredients listed above that comprise core material 2 and shell material 3, each underwent specific preparation procedures before they were combined and mixed to produce a product as herein described. The preparation procedures may vary according to the desired mechanical or other properties desired, but for the purposes of this example, the methods were as follows:

Lobster shells were collected from commercial seafood processors in the U. S. and Maritime Canada. At the time of collection, the raw shell retained remnant amounts of cartilage and fleshy tissue. Therefore, prior to use in this example, the shells were heated and cleaned according to known methods to facilitate the manual de-fleshing and cleaning of the lobster shell, which was done using standard tools and procedures known in the seafood processing industry. Other known methods of de-fleshing including automated or enzymatic de-fleshing may also be used.

Once the bulk lobster shell completed this processing, the shell was portioned and loaded into an industrial comminuting mill, where it was ground to an average particle size of approximately 1 millimeter or less, and had a consistency similar to finely ground coffee.

When the ground lobster shell of this example had been processed and reduced to a powder as described above, it was ready to be combined with other ingredients.

Calcium carbonate was sourced from a commercial supplier, with product specification of 325 Mesh (44 micron), gelatin was sourced from a commercial supplier, with product specification of 275 Bloom Type A 8-Mesh, USP grade glycerin was sourced from a commercial supplier, and used in this example. The gelatin may serve as the media, alone or with another substance, such as water, for combining the other ingredients described in this example.

Sorbitol was sourced from a commercial supplier, and a solution known as Sorbitol Special was used in this example. USP grade or other sorbitol may also be used.

In this example, the dry ingredients (lobster shell material, calcium carbonate and gelatin) were mixed thoroughly and then the glycerin, sorbitol and water were added and all ingredients were further mixed. After thorough mixing, after which the mixture may have a consistency similar to wet cement, the combination of ingredients were heated and molded into a desired shape, in this example a sphere. In this case, heating was performed using a hot water bath at approximately 85° C., though other heating sources, times, and mechanisms are contemplated as within the scope of the invention and will be necessary or desired depending upon available equipment and desired application. During heating, the mixture was stirred periodically to facilitate homogenization and heating was continued until the gelatin was substantially fully dissolved. After heating, the mixture was transferred to two core-mold cavities, each which comprise two half spherical portions, each of which were filled with heated core material. Once filled, the two halves of each core-mold were clamped together and the mixture was allowed to cool. If desired, the mixture could be rapidly cooled using available technologies such as a refrigerator or freezer. Once cooled, the substantially solid spherical golf ball core material was allowed to sit exposed to the atmosphere at room temperature for one week. It was observed that the core material lost mass over a one week time period following cooling. Without wishing to be held to a particular theory, it is possible that this loss of mass is due to loss of water during exposure to the atmosphere.

The result of the above process is a series of substantially spherical golf ball cores. Once the batch of golf ball cores, shown in FIG. 1 as core material 2, had undergone heating, molding, and cooling as described above, shell material was manufactured as follows.

In this example, the shell material comprised gelatin, glycerin, sorbitol, titanium dioxide (as a colorant) and water. The dry ingredients (gelatin and titanium dioxide) were first combined and thoroughly mixed, then the wet ingredients (glycerin, sorbitol, and water) were combined and mixed. Finally the mixed dry ingredients were combined with the mixed wet components and then an additional thorough mixing step was performed.

After mixing, the shell material was placed in a hot water bath set to approximately 85° C. During heating, the mixture was stirred periodically to facilitate homogenization and heating was continued until the gelatin was substantially fully dissolved.

After heating, the shell material was transferred to a plurality of dimpled golf ball mold cavities, each having two hemi-spherical cupped halves. The cupped portion of the mold cavities had a diameter that is slightly larger than the diameter of the golf ball core material, here approximately 37.5 mm in diameter. Additionally, the inner walls of each mold cavity had interior surfaces comprising substantially covered with small spherical mounds. These mounds represented the negative impressions for the "dimples" that are characteristic of a golf ball's shape and for the creation of the recessed dimples 4 shown in FIG. 1. Each half of each mold was filled to approximately one third of its capacity by volume. A golf ball core 2 was added to one half of each dimpled golf ball mold cavity and suspended in the shell material using pins. Once properly positioned, the second half was placed over the first so that the core material was completely encased in the shell material. Both halves of each dimpled golf ball mold cavity were then clamped together and the shell material were placed in a freezer and allowed to cool for 10 minutes. After cooling, the newly formed golf balls comprising a core material and shell material were removed from the dimpled golf ball mold cavities and exposed to the atmosphere at approximately room temperature for one week.

After formation of a shell material 3, as described above, the mold cavities are separated and the spheres, now comprising core material 2 and shell material 3 were ejected from the mold. The spheres were fully formed biodegradable golf balls 1 that measured approximately 4 centimeters in diameter and weighed between 40 and 50 grams each.

While informal testing showed that the golf balls of the present example are capable of performing similarly to standard golf balls in most situations, objective data was also captured. Specifically, in order to simulate the impact from a traditional golf swing, a sample of balls created in this example were fired at approximately 100 miles per hour (mph) at a steel plate to determine if the balls could survive impact. The initial test was conducted after each ball was exposed to the atmosphere for one week with subsequent tests conducted at one week intervals as long as the ball survived (so test 3 was conducted after the ball had been exposed to atmosphere for three weeks). The data is shown below in Table 3 and it is presented as the specific core material-shell material embodiment used in that test.

TABLE 3

|  | Test 1 | Test 2 | Test 3 | Test 4 |
|---|---|---|---|---|
| Core1-Shell1 | Failed | | | |
| Core1-Shell1 | Failed | | | |
| Core1-Shell2 | Passed | Passed | Failed | |
| Core1-Shell1 | Failed | | | |
| Core1-Shell2 | Passed | Passed | Passed | Failed |

In order to examine performance of embodiments of the invention as multi-use golf balls, a sample ball, incorporating crab shell material and manufactured according to the above process for Core2 and Shell 2 as shown in tables 1 and 2 above, was tested for resistance to multiple high impacts, hypothesized to be similar to a drive swing from a professional-class golf player. The golf ball was repeatedly fired at 100 mph as described into a steel plate assessing condition of the ball after each firing. Unlike the experiment shown described above and in table 3, these firings were made consecutively, rather than with a one week lag between firings. After a total of 15 such firings at 100 mph, no evidence of ball failure was noted.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A biodegradable golf ball comprising
a core comprising
a crustacean shell material; calcium carbonate; gelatin; sorbitol, water and glycerin; and
a shell comprising
gelatin, water and at least one of glycerin and sorbitol;
wherein the biodegradable golf ball is characterized in that, when it is exposed to water for an extended period of time, the biodegradable golf ball at least partially decomposes;
wherein the shell completely envelops the core.

2. The biodegradable golf ball of claim 1, wherein crustacean shell material comprises about one sixth or more of the biodegradable golf ball by weight.

3. The biodegradable golf ball of claim 1, wherein gelatin comprises about one third to about two thirds of the biodegradable golf ball by weight.

4. The biodegradable golf ball of claim 1, wherein the shell further comprises a colorant.

5. The biodegradable golf ball of claim 1, wherein the ratio of crustacean shell material, calcium carbonate, gelatin, water, glycerin and sorbitol comprising said core is about 19.5:2.6:19.5:16.9:0.1-2.6:0.1-2.6.

6. The biodegradable golf ball of claim 1, wherein the ratio of gelatin, water, glycerin and sorbitol comprising said shell is about 30:30:0.1-2:0.1-2.

7. A method of making a biodegradable golf ball comprising
providing crustacean shell material;
combining crustacean shell material, calcium carbonate, gelatin, sorbitol, water and glycerin to form a core material;
heating the core material to between about 65° C. to about 100° C.;
shaping said core material;
cooling the shaped core material;
providing gelatin, water, and at least one of glycerin and sorbitol;
mixing said gelatin, water, and at least one of glycerin and sorbitol to form a shell material;
enveloping the cooled shaped core material in the shell material;
hardening the shell material to form a biodegradable golf ball;
wherein the biodegradable golf ball is characterized in that, when it is exposed to water for an extended period of time, the biodegradable golf ball at least partially decomposes
wherein the shell completely envelops the core.

8. The method of claim 7, wherein the crustacean shell material comprises about one sixth or more of the golf ball by weight.

9. The method of claim 7, wherein gelatin comprises about one third to about two thirds of the biodegradable golf ball by weight.

10. The method of claim 7, wherein the shell material further comprises a colorant.

11. The method of claim 7, wherein the ratio of crustacean shell material, calcium carbonate, gelatin, water, glycerin and sorbitol comprising said core material is about 19.5:2.6:19.5:16.9:0.1-2.6:0.1-2.6.

12. The method of claim 7, wherein the ratio of gelatin, water, glycerin and sorbitol comprising said shell material is about 30:30:0.1-2.0:0.1-2.0.

* * * * *